United States Patent [19]

Rose

[11] Patent Number: 4,840,602

[45] Date of Patent: Jun. 20, 1989

[54] TALKING DOLL RESPONSIVE TO EXTERNAL SIGNAL

[75] Inventor: William J. Rose, West Hartford, Conn.

[73] Assignee: Coleco Industries, Inc., West Hartford, Conn.

[21] Appl. No.: 127,903

[22] Filed: Dec. 2, 1987

Related U.S. Application Data

[63] Continuation-in-part of Ser. No. 11,600, Feb. 6, 1987.

[51] Int. Cl.⁴ ............... A63H 30/00; A63H 3/28; G11B 31/00
[52] U.S. Cl. ................................. 446/175; 446/297; 446/397; 273/1 E; 273/DIG. 28; 358/335; 340/825.69; 360/79
[58] Field of Search ............... 446/303, 297, 298, 300, 446/301, 397, 175; 434/307, 308, 323; 360/79, 80; 340/539, 721, 696, 825.72, 825.69; 273/DIG. 28, 1 E; 358/335, 142

[56] References Cited

U.S. PATENT DOCUMENTS

| | | |
|---|---|---|
| 3,199,248 | 8/1965 | Suzuki . |
| 3,287,849 | 11/1966 | Weiss . |
| 3,685,200 | 8/1972 | Noll . |
| 3,688,268 | 8/1972 | Bedjai et al. ............... 360/79 X |
| 4,080,637 | 3/1978 | Chase et al. ............... 360/80 |
| 4,118,876 | 10/1978 | Brilakis . |
| 4,282,676 | 8/1981 | Davis . |
| 4,451,911 | 5/1984 | Klose et al. . |
| 4,457,719 | 7/1984 | Dittakavi et al. . |
| 4,480,253 | 10/1984 | Anderson ............... 340/825.69 |
| 4,516,950 | 5/1985 | Berman et al. . |
| 4,642,710 | 2/1987 | Murtha et al. . |
| 4,660,033 | 4/1987 | Brandt ............... 446/301 X |
| 4,696,653 | 9/1987 | McKeefery ............... 446/303 X |
| 4,729,563 | 3/1988 | Yokoi ............... 273/DIG. 28 |

Primary Examiner—Mickey Yu

[57] ABSTRACT

A doll cooperates with a remote signal source which provides a narration with which the doll interacts, and it has a vocabulary stored in digital data in a memory which may be accessed to cause a speech synthesizer in the doll to simulate speech. The doll has a radio frequency receiver which receives encoded data from the remote signal source, and a central processing unit which accesses the memory for selected speech data to simulate the doll's response to portions of the narration from the remote signal source. The remote source provides a narrative and substantially simultaneously transmits a radio frequency signal providing binary coded data which, when analyzed by the logic of the doll, elicits an intelligent or responsive statement from the doll. In one embodiment, the remote source includes a cassette tape player for providing the narration and the encoded signals. In another embodiment, the remote source includes a TV for outputting a coded light pattern, and a photo sensor for recognizing the light pattern and allowing the remote source to transmit a coded signal to the doll.

8 Claims, 4 Drawing Sheets

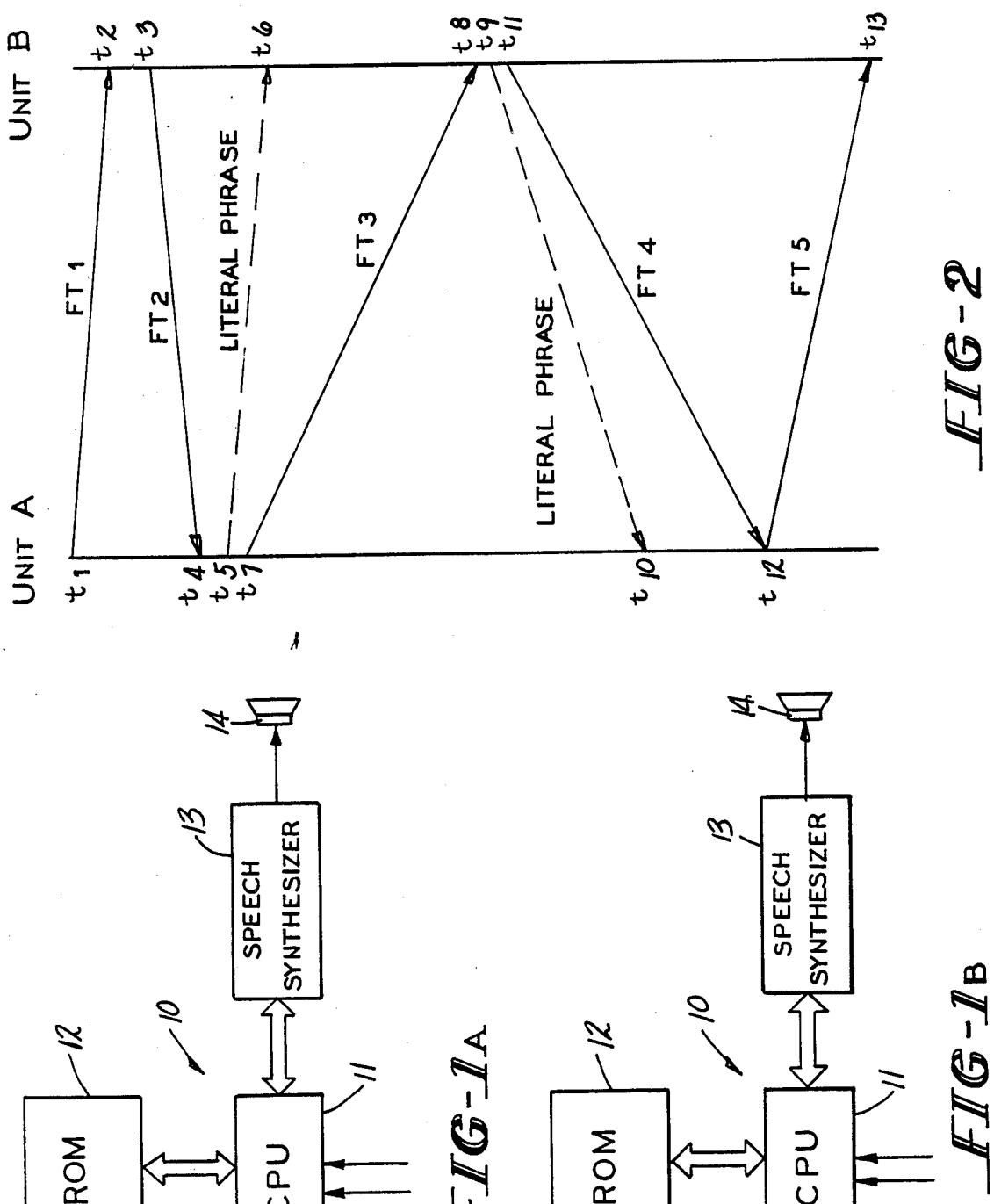

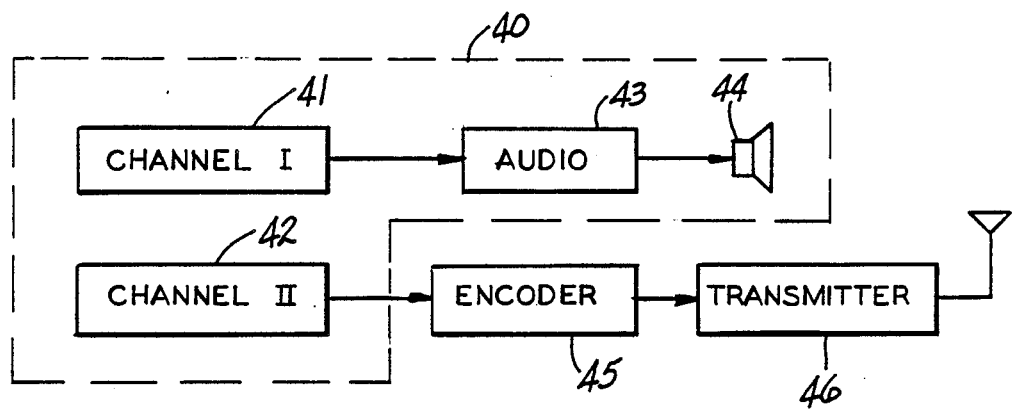
FIG-6
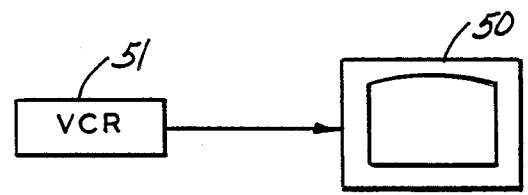
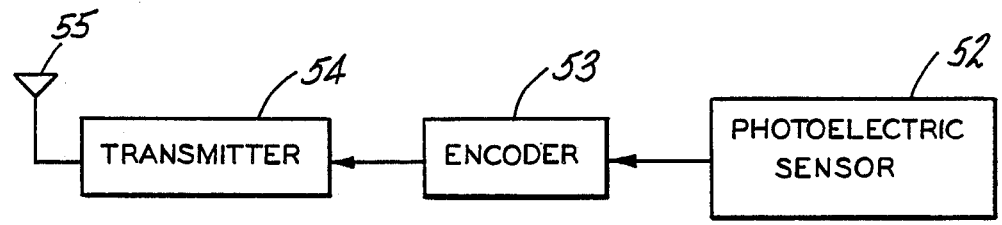
FIG-7

TALKING DOLL RESPONSIVE TO EXTERNAL SIGNAL

RELATED APPLICATION

This application is a continuation-in-part of co-pending application Ser. No. 07/011,600 filed Feb. 6, 1987.

FIELD OF THE INVENTION

This invention relates to talking toys such as dolls, and more particularly, to one or more of such toys which may simulate intelligent conversation in response to a narration or a story being played on a recording medium.

BACKGROUND OF THE INVENTION

Since the mid-1800's, talking dolls have been known. These early dolls were generally of two types: one with a string activated wood and paper bellows said "Mama" or "Papa", the other relied on a weight activated cylindrical bellows with holes along one side to emit a crying sound when moved. Some dolls are still made this way today.

In the 1890's a doll known as the "Jumeau Bebe and a Phonographe" told jokes, spoke phrases like "Hello, my dear little Mommie", using a mechanism designed by Thomas Edison, which was a wax cylinder recording activated by a key wound clockwork-like mechanism. In the early 1900's a doll known as "Dolly" sang and recited nursery rhymes. These dolls also used cylindrical records, but the recordings were probably on plastic or rubber cylinders.

In 1960, a doll known as "Chatty Kathy" was introduced which had a repertoire of eleven to twenty-two phrases. The voice mechanism was operated by a pull string which activated a miniature phonograph disc that played back pre-recorded phrases.

Over the years, there have been many efforts to make a doll more lifelike and communicative with its owner. U.S. Pat. No. 3,293,794 discloses an animated talking doll with a mouth actuating mechanism; eye and lip movements were coordinated with a phonographic means for reproducing speech. U.S. Pat. No. 3,315,406 proposed an improved mechanism for coordinating the movements of the jaw with a phonograph. U.S. Pat. No. 3,745,696 disclosed a doll in which there were multiple animations in the face.

More recently, it has been proposed to combine a cassette recording in a doll, and the recording includes signals which will synchronously control the movement of the mouth of the doll as the recorded phrases are reproduced. It has further been proposed to have two dolls with cassette recordings which will appear to simulate intelligent conversation. These last mentioned dolls have also been provided with mouth actuating means which move the mouth in synchronism with the recorded speech.

A drawback with these dolls is that they are not interactive with the child. Some toy manufacturers maintain that the talking dolls improve the play value for children between three and nine years. Some child psychologists and parents disagree, stating that these dolls do nothing to stimulate a child's imagination. The result is that children are reduced to reacting to a toy passively, much like watching television.

A professor of child development at a leading university has stated that talking toys serve to try to get children to have a more limited dialogue with themselves. A child development specialist in the Pediatrics Department of a West Coast hospital observed that children often turn off their high tech dolls. This specialist has stated that, when he goes through the rooms of a pediatric center, he rarely hears children playing with them. Initially, the children are fascinated, but, when the thrill wears off, young children use them in their own way, much as a snuggling teddy bear. Young people need toys which inspire their imagination.

The loss of interest of the child in the speaking ability of a toy is believed to be due to the repetitious nature of the speech provided by the toys. Children soon become cognizant of the repetitive nature of the vocabulary and lose interest.

The related co-pending application discloses dolls having speech synthesizers, together with vocabulary words and phrases stored in memory which may be accessed depending upon a radio frequency transmission from another doll. In a doll network, one doll randomly becomes a speaker while the other(s) merely responds during a given conversational routine. After completion of a routine, another doll may become the dominant speaker for a second routine.

A single doll is provided with a speaking system which includes a central processing unit (CPU), a read only memory (ROM) having digital data indicative of speech stored therein, and a speech synthesizer including an audio amplifier which will amplify speech phrases selected from the ROM and apply the synthesized speech to a speaker. The doll's vocabulary is selected so that it can be concatenated into phrases for establishing what is referred to as a routine, and various sessions of speech within each routine. Additionally, the synthesized speed is made responsive to various positions of the doll or the actuation of certain sensors on the doll, or even the motion of the doll.

Such a doll is capable of interacting speechwise with other dolls and thereby providing interaction of the children who own the dolls. Logic systems of the dolls are so arranged that a multiplicity of dolls may engage in a network of speech. A doll may periodically initiate a signal to determine if a similar doll is within its radio frequency (RF) broadcast range, and, if this is detected, the dolls will engage in a routine of simulated conversation which is divided into succeeding sessions. In the case where two dolls are present, determination is made of who will be the speaker and who will be the responder for a first session. After such first session, another determination is made of who will be speaker and who will be responder for the next session in this routine. A third, fourth or more dolls which are present during a sequence will be listeners and provide occasional responses; however, the third, fourth or other dolls, upon beginning of the next session, may become the speakers and/or responders, and the previous speaker and responder may then become listeners.

This selection of who is speakers and responders is done in a random fashion, so that it will appear to the owners of the dolls that all dolls are engaging in the simulated conversation.

At the beginning of a session, the first doll to send its RF signal message is referred to as the "A" doll. The "A" doll will randomly select a routine in its memory and broadcast a radio frequency signal identifying the routine and other data hereinafter described. The first of the other dolls, dependent upon a random basis, to respond to the first doll, will become the responder or "B" doll, and any remaining dolls will then be listeners or "C" dolls for that session within the routine, but in some sessions, may utter a response. In this manner, there will be no confusion or collisions between the spoken words of the dolls.

Additionally, an "A" doll, after selecting simulated speech, will then transmit a binary coded signal over a RF transceiver. This binary coded signal will be picked up by the randomly selected "B" doll and compared with that sequence of the routine selected by the "A" doll. The memory of the "B" doll will contain a plurality of possible responses, which may be selected on a random or predetermined basis and then the selected answer is transmitted on the radio frequency transceiver of the "B" doll. This may complete a session within a routine, at which time all dolls in the network may randomly generate a signal to determine who will be the next "A" doll. However, the session may include additional transmissions by both dolls together with literal communication.

SUMMARY OF THE INVENTION

Briefly stated, the invention, comprises one or more dolls as described which interact with an external signal source telling a story or narrative recorded on a medium such as magnetic tape. The tape, which has two tracks or channels, has recorded on one track a story or narrative, and has recorded on the other track binary data which is broadcast by a radio frequency transmitter. The broadcast includes data which will instruct the doll not to become an "A" doll, initiate speech, directions to synthesize speech in response to a spoken phrase in the story or narrative, and directions to make a statement which is intelligent with respect to a spoken phrase of the narrative.

An object of this invention is to provide a new and improved system to simulate interactive communication with a talking doll.

Another object of this invention is to provide a simulated story telling and vocally responsive system involving one or more dolls wherein the responses are random and not always repetitive.

A further object of this invention is to provide a new and improved learning device for a child where the child's doll appears to participate in an interactive system providing a child with responses to comprise a learning experience.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIGS. 1a and 1b are block diagrams of the logic systems of two dolls which may be utilized in the invention;

FIG. 2 is a timing diagram exemplifying steps of operation of the systems of FIGS. 1a and 1b;

FIG. 6 is a schematic block diagram illustrating a portion of the invention; and FIG. 7 is another schematic block diagram illustrating another embodiment of the invention.

DETAILED DESCRIPTION OF PREFERRED EMBODIMENTS OF THE INVENTION

Figure 3:
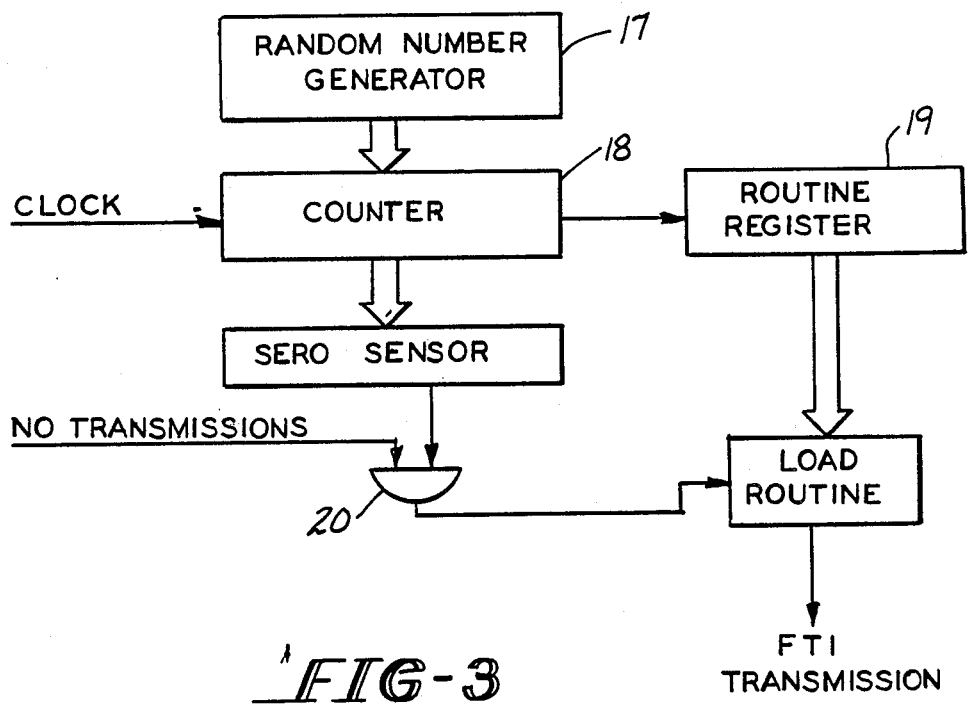
FIGS. 3 and 4 are logic block diagrams exemplifying steps of selecting dolls for speech.

The present invention may best be described by first setting forth the disclosure of co-pending application Ser. No. 07/011,600 filed Feb. 6, 1987 relative to the logic of dolls utilized in the invention.

Referring now to FIG. 1a and 1b, each doll includes a speech synthesizing system 10, which includes a central processing unit (CPU) 11 in the form of a microprocessor, a read only memory (ROM) 12, shown as coupled directly to the microprocessor 11 although it could be coupled to the microprocessor through a speech synthesizer 13. The speech synthesizer will generally include an audio amplifier (not shown) which provides an output to drive a speaker 14. As will hereinafter be described, the speaker 14 may also act as a microphone, or a separate microphone may be provided, but no microphone is necessary to the operation of the present invention. A combination of the CPU, ROM and speech synthesizer is disclosed in U.S. Pat. No. 4,331,836, assigned to Texas Instruments, Inc. However, the various components shown in FIG. 1, i.e. the CPU, ROM, speech synthesizer, and audio amplifier, may be defined in a single integrated circuit chip. In fact, such a chip is utilized in practicing the present invention and is identified by its manufacturer Texas Instruments, Inc. as a TMS5OC44 chip. The CPU of FIG. 1 communicates with a radio frequency (RF) transceiver 15, which may receive a binary coded message from another doll, or it may transmit a binary coded meassage to all other dolls in a network.

The CPU 11 also receives as other inputs four position sensing inputs, a sound level input, and a push button switch input. As will hereinafter be described, the doll will have routines, depending on the various inputs.

All direct communication between the units is by radio frequency (RF) transmission of binary coded data. However, the dolls will appear to be audibly speaking to each other.

Data is transmitted as if it were a letter within a frame envelope. A frame envelope is a series of binary bytes transmitted in serial fashion, as hereinafter explained.

There will be stored in the ROM's of every unit a vocabulary in ordered routines and sessions. The term "routine" refers to predetermined orders of conversation between the interactive units. The term "session" is a subdivision of a routine. The unit which initiates a routine randomly picks a routine, identifies each routine which is randomly selects, and includes a routine memory. This routine memory prevents the same routine from being randomly chosen again until four other routines have been experienced.

Set forth in Table I below is the content of a frame envelope which comprises nine eight bit bytes.

TABLE I

| Byte No. | Bytes |
|---|---|
| 1 | Preamble |
| 2 | Preamble |
| 3 | Destination |
| 4 | Source |
| 5 | Frame Type (FT) |
| 6 | Phrase Code |
| 7 | Phrase Code |
| 8 | Routine and Session No. |

TABLE I-continued

| Byte No. | Bytes |
| --- | --- |
| 9 | Positive or Negative Response |

As shown, a transmission comprises nine bytes, and each transmission comprises nine bytes in an ordered array. The first two bytes are preamble bytes and represent timing signals; the third byte identifies the responding doll, the fourth byte identifies the initiating doll; the fifth byte identifies the type of transmission, as will be hereinafter explained. The fifth and sixth bytes are "phrase codes" and identify the literal phrase which will be spoken next by the transmitting doll. The eighth byte identifies the routine and the session number within the routine. The ninth byte identifies whether the response is to be positive or negative; and the tenth and eleventh bytes are for optional information, dependent upon the routine or other circumstances.

Each byte has eight bits. Each byte is proceeded by a zero level signal and terminated by a one level signal so that the receiver may count the bits in each byte.

FIG. 2 is a timing diagram of the conversation that will go on between units. At time t1, what will be referred to as an "A" unit initiates a frame type 1 (FT1). The "A" unit will hereinafter referred to as the speaker, and a "B" unit will be referred to as a responder.

When there are more than two units in the network, the potential responders will have to determine who will be the actual responder. The speaking unit A will send a message as identified in FIG. 2 with all information therein except as to byte 3, since it does not know who, at that point, the responding unit will be. If there are more than one responding units, the responding unit as will hereinafter be described will determine who the principal responder or unit B is to be. This will occupy the time between $t_2$ and $t_3$. When unit B has been determined, it will transmit a signal as shown in FIG. 2, in which it identifies itself in such frame transmission (FT2) and will identify only unit A as the source. Units in a network respond only if they have been identified as a speaker or a primary responder. However, a C unit may make some response. Therefore, after unit A and unit B, all others potentially in the network, will be C units. At this point, the speaker, unit A, and the primary responder, unit B, have been identified and all others have been locked out from primary speech. Unit B will send an FT2 signal back to unit A, which is received at time $t_4$. The format of the message will be as shown in Table I, but in byte 3, the unit B has now been identified, so in byte 5, the frame type has now been identified as FT2, so the primary network has been set up between unit A and unit B. At time $t_5$, unit A, will now utter literal speech in audio form which is audibly apparent to the owners of the participating dolls, and shortly thereafter, between time $t_5$ to $t_6$, will convey a message denoted as FT3 to unit B. The message FT3 will be in the format as shown in Table I, and will identify the selected B unit in byte 3; the sending unit in byte 4; the type of transmission FT3 in byte 5; and phrase codes and instructions for response in bytes 8 and 9. In doing so, it will identify the routine and session number and whether it wants a positive or negative response. This is received by unit B at time $t_8$. At this time, unit B will have a possibility of more than one response, which is intelligible to the words of the A doll, and the response is chosen on a random basis and broadcast vocally and literally at time $t_9$-$t_{10}$. At time $t_{11}$, the B unit will make another transmission which will identify to unit A and any other units in the network the identification of response which it has given. This will be received by unit A at time $t_{12}$ as a FT4 transmission. All FT4 transmissions are closely accompanied by or shortly succeed a literal statement of synthesized speech, and the transmission FT4 will identify to unit A the response during this session of a routine.

In FIG. 2, only one transmit FT3 and one return FT4 transmission has occurred. However, depending upon the routines, there may be two or more FT3 and FT4 transmissions between units A and B during a session.

Dependent upon the programming of a session, when the session is concluded, unit A will transmit an FT5 message. This will be indicated in byte 5 of Table I. An FT5 transmission is an indication that the session has been terminated and a new session is to start. Alternatively, if the concluded session is the last session of a routine, a new routine will be selected as hereinafter explained.

Figure 4:
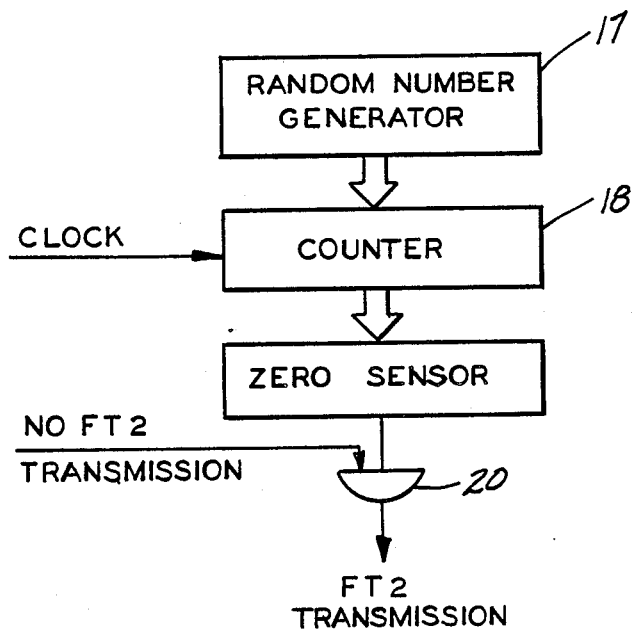

The A doll is selected on a random basis. When a doll sends an initiating or a HRE (hand raising event) signal, all operative dolls within receiving range generate a random number in a random number generator 17. Refer to FIG. 3. This number is loaded into a counter 18 which randomly selects a speech routine from a routine register 19. The counter is decremented by clock pulses toward zero. If no transmissions have been received when the counter reaches zero as sensed by a gate 20, the doll will load the selected routine and initiate an FT1 transmission. While FIG. 3 and FIG. 4 are shown in hardware form, their function may be performed by software instructions.

The following Table II sets forth a routine termed "Pretend". This routine will be discussed for purposes of illustration. At the top of the table, the Routine Number is displayed in parentheses followed by the name of the Routine or Interrupt.

Within each routine, all doll speech is divided into a number of Dialogue Headings. Each heading is underlined and followed by a colon : the specific phrases and sentences that a doll can speak are displayed directly below it. Headings that are indented one tab indicate dialogue spoken in single doll play or dialogue spoken by doll A in multi-doll play. Headings indented two tab spacings indicate dialogue spoken only in multi-doll play. A phrase number is associated with each heading.

If a sensor or sensors are to be checked after a phrase or sentence is spoken, the appropriate sensor(s) are indicated as part of the dialogue heading in parentheses in upper/lower case. If only one sensor is to be checked, but that sensor is dependent upon the diaglogue spoken, the potential sensor checks are each separated by a colon.

Any dialogue that is dependent upon a sensor check is indicated with the sensor result in upper case lettering in parentheses as part of the dialogue heading. Dialogue that can be spoken in multi-doll play is indicated by the doll's designated part A, B, or C in < > following the dialogue heading after the colon. For doll C parts, the type of chorus response is also indicated—unison, scattered, or staggered. The C dolls may speak dependent on the routine.

Under each dialogue heading, the following symbols and conventions are used to indicate how phrases from the Concatenation List are chosen, put together, and spoken to create doll speech: Phrases are grouped either into tables of various column lengths or as concatenated sentences. A blank line between each table or sentence within a dialogue heading indicates an alternate speech selection. The doll chooses randomly with equal probability what it will say from one of the alternatives.

Phrases which are grouped into columns are selected randomly, one phrase from each column and concatenated together to form a spoken "sentence". Each phrase within a column has an equal probability of being selected.

The use of square brackets [] is two-fold. They are used to indicate alternate phrases within a column; or, if used at the top of a column of phrases, they indicate that the column itself is optional (equivalent to a null entry within that column).

A slash / between words indicates a concatenation between doll phrases (from the Concatenation List).

Parentheses ( ) indicate either a sound effect from the Concatenation List or a programmer's note.

A pair of asterisks * * indicate that one of the designated word lists from the vocabulary or concatenation list is being called or used.

A period . is used to indicate the end of a sentence (and a phrase).

Question marks ?, exclamation marks !, and underlining are used in some phrases to indicate work emphasis and also as guidelines to actual speech.

A set of four dots .... is used to indicate the continuation of a sentence or a table listed directly above within the dialogue heading.

A Hand Raising Event, HRE, in multi-doll play is indicated by =HRE=.

TABLE II

PRETEND ROUTINE NO.
SESSION I
(1) INTRO: <A>
Y'know what?      It's fun / to play pretend. / Isn't it?
[(sig. phrase)]   [Do you like / playing pretend. / I do!]
                  [I really like / playing pretend. / Don't you?]
(2) + INTRO RESPONSE: <B & C -staggered>
    Yeah!         [It's / great!]
    [Ok]          [I just love / playing pretend].
    [Sure]        [Let's play].
                  [That's / so much fun].
                  (giggle)]
(3) – INTRO RESPONSE: <B & C - unison>
    No way!
    [Nope]
    [I don't like / playing pretend.]
    [Not me]
SESSION II
(4) SUGGESTION (Bounce Sensor): <A>
I've got an idea!   Let's pretend    We're on a plane   and we're
[Hey]               [Make believe]   [We're on a boat]
[(sig. phrase)]                      [We're on a merry-go-round]
. . . Going up and down. / C'mon! / Hold on to me. / Bounce me /
[on your knee].
(5) POSITIVE RESPONSE (Bounce): <A>
    Wow!           That's / great!
    [(laugh)]      [This is / so much fun].
    [(sig. phrase)] [Yay! / Faster!]
    [(giggle)]     [Faster! / Faster!]
(6) POSITIVE OTHERS RESPONSE (Bounce): <B:C>
    Yah!
    [Faster!]
    [Wow!]
    [That's / great!]
(7) STOP RESPONSE (Bounce): <A>
    Hey            That's enough!
    [Uh-oh]        [All this / bouncing up and down / makes me dizzy].
    Wow!           That was fun!       You're / a good friend.
    [(sig. phrase)] [That was / so much fun] [I'm glad you're here].
(8) NEGATIVE RESPONSE (Not Bounce): <A>

TABLE II-continued

PRETEND ROUTINE NO.
    C'mon!            Hold on to me! / OK?
    [Aw c'mon!]       [I just love / playing pretend / but you'll
    have to help me].
    [Hey]
(9) 2ND NEGATIVE (Not Bounce): <A>
    Y'know what?             I don't like / playing pretend.
    [OK]
    Hey               Don't you wanna play with me?
    [(sob)]           Please! / Talk to me].
    [Aw c/mon!]       [Please! / Be my friend].
                      [Let's play / ok?]
=HRE=
SESSION III
(10) THIRSTY COMMENT: <A>
    WOW!              [All this] / bouncing up and down / makes me
                      awfully thirsty.
    [Whew]
    [Y'know what?]
    [Hey]
    [(sig. phrase)]

Referring to Table II, assume that a doll has made an FT1 transmission and has become an A doll. The FT1 transmission will identify the A doll. This FT1 transmission has identified the routine "Pretend" and the session to any other operative dolls within broadcast range. Now, the other dolls, if more than one, will determine who will be the B doll. This is accomplished in a random manner. Briefly refer to FIG. 4.

Random number generator 17 will again load a random number in counter 18 if an FT1 transmission has been received. Counter 18 will be decremented by clock pulses and, when the counter reaches zero and no FT2 transmissions have been received, the doll will be established as a B doll and will make an FT2 transmission. A network has now been established between A and B dolls, and other dolls are C dolls. It will be understood that all dolls have essentially the same stored vocabulary and may be A, B or C dolls. If not the same, the vocabularies will be compatible.

At time $t_5$ (FIG. 2), doll A will make a FT3 transmission to doll B which has broadcast its identification number in its FT2 transmission.

Doll A will look at a counter and dependent on a number in its least significant bits select a phrase shown as

Y'KNOW WHAT or

SIGNATURE PHRASE

A signature phrase is one such as

GEE

WOWIE

OH MY GOODNESS which is randomly selected when the doll is first powered up. Then the doll will randomly select a second phrase as shown under (1). These phrases are uttered in synthesized speech between times $t_5$ and $t_6$ (FIG. 2) and at time $t_7$ broadcasts an FT4 transmission. This may elicit a positive response from B and C (if present) as shown under (2) or a negative response as shown under (3). The type of response is randomly ordered by byte 9 as shown in Table I, and occurs between times $t_{11}$ and $t_{12}$ as shown in FIG. 2.

The A doll receives this return FT4 transmission from the B doll and then makes an FT4 transmission which will terminate this session.

In the program for this routine a HRE event now occurs. Referring again to FIG. 3, all dolls will now generate a random number in generator 17 and apply it to counter 18 to determine who will be the A doll. However, at this time the selected routine of Table II is still operative and the remaining sessions will follow as shown.

In the routine of Table II if there is no FT2 response the A doll will initiate a HRE signal. If there is still no response the A doll will proceed through steps (4), (5), (7), (8), or (9), and then initiate another HRE. If there is still no response the doll will go to step (10) and then randomly select another routine.

The phrases for the routine shown in Table III are stored in the speech data table of ROM 12 in addressable locations as shown in Table III.

TABLE III

VOCABULARY AND CONCATENATION LIST REPRESENTATIVE OF TABLE II

| ADDRESS | PHRASE |
|---|---|
| 213 | Y'know what |
| 81 | It's fun |
| 187 | To play pretend |
| 79 | Isn't it |
| 37 | Do you like |
| 134 | Playing pretend |
| 62 | I do |
| 78 | I really like |
| 134 | Playing pretend |
| 33 | Don't you |
| 211 | Yeah |
| 80 | It's |
| 52 | Great |
| 122 | Ok |
| 66 | I just love |
| 164 | Sure |
| 92 | Let's play |
| 171 | That's |
| 159 | So much fun |
| 45 | Giggle |
| 118 | No way |
| 115 | Nope |
| 63 | I don't like |
| 116 | Not me |
| 84 | I've got an idea |
| 93 | Let's pretend |
| 199 | We're on a plane |
| 53 | Hey |
| 98 | Make believe |
| 197 | We're on a boat |
| 198 | We're on a merry-go-round |
| 7 | And we're going up and down |
| 26 | C'mon |
| 56 | Hold on to me |
| 17 | Bounce me |
| 126 | On your knee |
| 209 | Wow |
| 171 | That's |
| 52 | Great |
| 91 | Laugh |
| 181 | That is |
| 211 | Yeah |
| 40 | Faster |
| 45 | Giggle |
| 211 | Yeah |
| 52 | Great |
| 53 | Hey |
| 172 | That's enough |
| 190 | Uh-oh |
| 5 | All this |
| 18 | Bouncing up and down |
| 100 | Makes me dizzy |
| 175 | That was fun |
| 214 | You're |
| 2 | A good friend |

TABLE III-continued

VOCABULARY AND CONCATENATION LIST REPRESENTATIVE OF TABLE II

| ADDRESS | PHRASE |
|---|---|
| 174 | That was |
| 159 | So much fun |
| 72 | I'm glad you're here |
| 26 | C'mon |
| 56 | Hold on to me |
| 12 | Aw c'mon |
| 66 | I just love |
| 21 | But you will have to help me |
| 213 | Y'know what |
| 63 | I don't like |
| 53 | Hey |
| 35 | Don't you want to play with me |
| 156 | Sob |
| 137 | Please |
| 167 | Talk to me |
| 16 | Be my friend |
| 137 | Please |
| 16 | Be my friend |
| 92 | Let's play |
| 5 | All this |
| 18 | Bouncing up and down |
| 99 | Makes me thirsty |
| 206 | Whew |
| 213 | Y'know what |

As shown, the phrases are stored in packed encoded form in a speech data table in ROM 12 and may be addressed and concatenated to form alternate sentences as shown in Table II.

Figure 5:
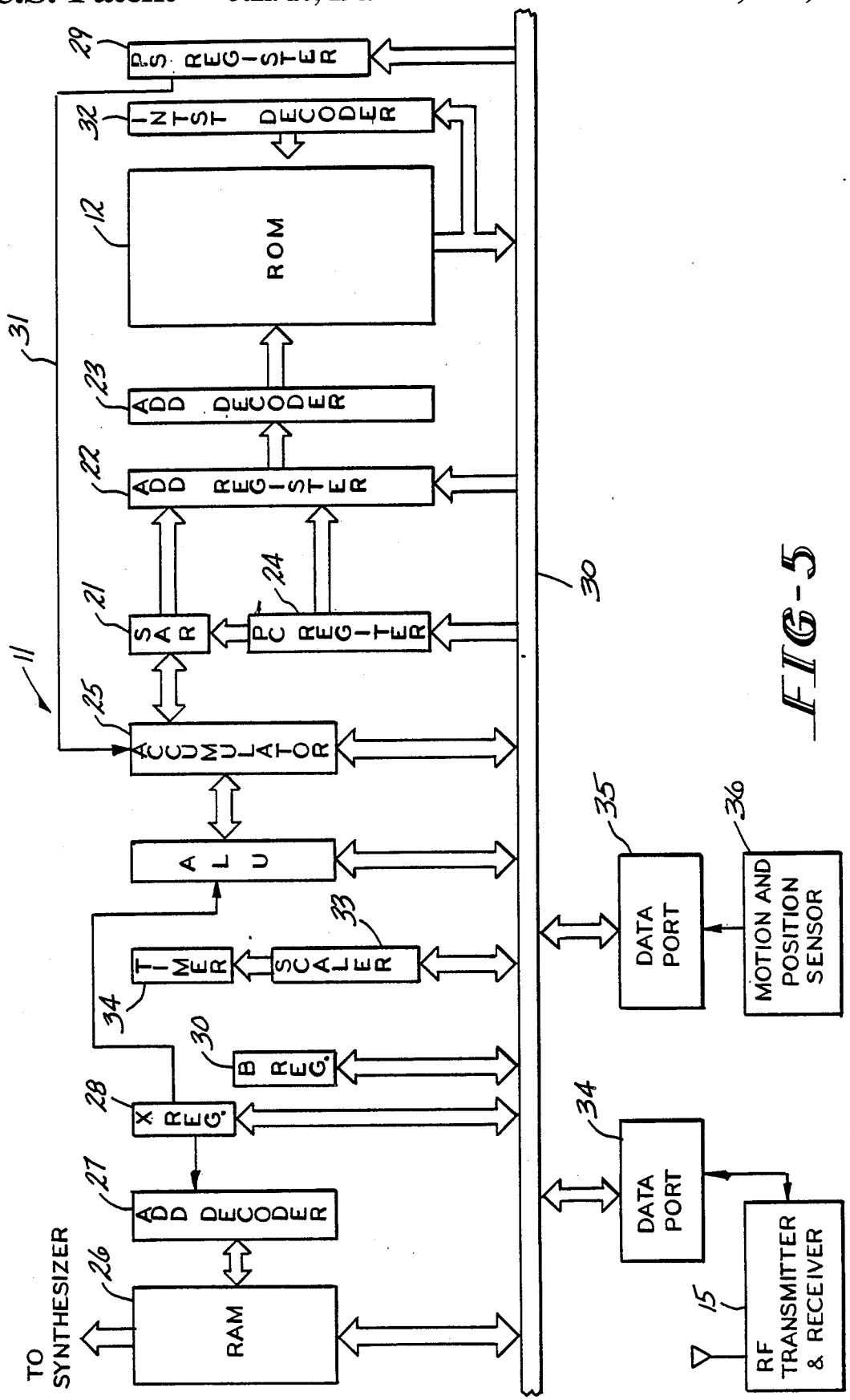
FIG. 5 is a block diagram of a microprocessor used in the invention.

The operation of the system is under the control of CPU 11 which is a general purpose eight bit microprocessor, which is shown in functional block diagram in FIG. 5. Microprocessor 11 includes a read only memory (ROM) 12 which includes the general program, decoding tables, speech address tables and a speech data table as hereinafter described.

The address logic comprises a first speech address register (SAR) 21 which stores the next speech data address, a second speech address register 22, and the address decoder 23. The address register 22 stores the current address and provides an incrementing function for both speech data address and program address.

Also included is a program stack (PC) register 24 which stores program addresses. Table lookup is provided by an instruction decoder 32 which uses the contents of an accumulator register 25 as an address to ROM 12 through SAR 21, and then stores the contents of that address back in the accumulator register 25. When this instruction is complete, the program address is stored in PC-register 24. PC-register 24 may store several programs (routines) for recall in the event of interruptions.

The system includes a random access memory 26 which has an address counter 27, and an X-register 28 which stores the address pointer for the RAM. When not executing speech, the entire RAM may be used for algorithm storage. RAM 26 will store decoded speech data and supply such data to speech synthesizer 13.

Once the starting address of speech data has been established in a speech register (SAR) 21, the first data byte indicative of the words to be spoken is transferred to a PS-register (parallel to serial register) 29 over an internal system bus 30 where this byte is serially shifted over line 31 to accumulator register 25. This speech data is unpacked, and then stored in the appropriate location in RAM. The second through the final speech parameter accesses will be similarly unpacked and decoded. The PS-register 29 is emptied of its contents by eight serial shifts. The next data byte is then transferred from the speech table to the PS-register. Once the initial speech address register value is established and the initial byte placed in the PS-register, subsequent acquisitions of data bytes are transferred from the speech data table to the PS-register, then to the accumulator and subsequently to the random access memory (RAM) 26.

The address decoder 23, in response to register 22, will locate selected speech data bytes in the speech table. The speech address register 21 verifies each by location. The address counter 22 will then increment or decrement to the addressed location. This information is then applied to the address decoder.

The accumulator register 25 is a general purpose register which provides an accumulation function for an arithmetic logic unit (ALU), Serial/Parallel conversion for speech data unpacking, and Table Lookup Address Source.

B-register 30 is also a general purpose register. The B-register is provided to serve as a software counter register to transfer its contents to the A accumulator register. The contents of the X-register and the B-register are exchanged, and the B-register is cleared. Finally, the B-register is incremented.

The microprocessor 11 further includes a prescaler register 33 and a timer register 34. This prescaler register is cascaded with the timer register. When the prescale register counts down to zero, it is loaded with the value stored in a preset latch. This preset latch is loaded by the instructions from the accumulator. When the prescale register counts down to zero, it also sends a decrement pulse to the timer.

The CPU 11 further includes a plurality of data ports 34 and 35. The RF transceiver 15 is shown coupled to data port 34. A motion and position sensor 36 is coupled to data post 35. Each unit may also receive other inputs such as sound level, body position sensor and push button inputs.

The ROM is organized to store the following information:
1. programs for routines as exemplified in Table II.
2. a sentence table with pointers for,
3. a phrase table with pointers for
4. a concatenation table with pointers to a
5. a speech data table, and
6. algorithms for generating random numbers.

The SAR 21 points to the sentence table though address decoder 23. The sentence table then points to a table of a list of phrases of which the sentence is constructed, and the phrase table points to phrases in the concatenation table. The concatenation table then points to data in the speech data table.

As shown in Table II, a routine is identified in the program routine table, identified in the sentence table, but requires phrases to be selected to form a sentence. The sentences are formed from a vocabulary of concatenation list as exemplified in Table III.

The speech data for forming the sentences shown in Table II are stored in ROM 12 in phrases as shown in Table III. The routine Pretend is randomly selected and stored in the PC-register 24.

The SAR 21 under the control of the PC-register 24 then addresses the ROM through address register 22 and address decoder 23 to the sentence table in ROM 12. The sentence table then points to the phrase table to select the phrases to be used in constructing a sentence. The phrase table in turn points to the concatenation table which selects the word bytes in the speech data table which are read out to PS register 29. The bytes are transferred to accumulator 25 for unpacking and then stored in predetermined location in RAM 26. When all of the phrases of a sentence are stored in RAM 26, the system is ready to have the synthesizer 13 make a literal utterance and such literal utterance is then made upon address by the X-register 28. The synthesizer 13 then converts the digital speech data into an analog signal which is applied to speaker 14 and the sentence is uttered.

Assume that the literal utterance has now been made by an A doll. The data stored in RAM is supplied to the RF transmitter in the form shown in Table I and transmitted to the other doll where it is stored in RAM. The B doll has established the routine in its PC-register 24 and will now select an appropriate response from one of the possible responses as shown in Table II. The response is done on a random basis dependent on the existing least significant bits in a counter, which may be B-register 30, and whether the A doll has called for a positive or negative response in its envelope transmission as shown in Table I.

In the routine exemplified, a positive interaction is called for with the child, namely BOUNCE. The doll includes a motion and position sensing device 36 which is disclosed and claimed in co-pending application Ser. No. 07/011,836 filed Feb. 6, 1987. When motion is sensed one of statements (7), Table II will be selected for speech. If no motion is detected, then a negative statement as shown in (8) and (9) of Table II will be made.

When a doll is established as an A doll and makes an FT1 transmission, it identifies the routine to be followed. This is remembered by the B and C dolls and they will remember their designation (B or C) throughout the routine. This designation may be stored in the PC-register so that only appropriate responses will be made when SAR 21 addresses ROM 12.

During a routine, when a HRE occurs (Session II (4) shown in Table II) the desgination as A, B, or C dolls may change, but the same routine continues until the routine is completed.

Table IV sets forth a single doll routine which is an interrupt. When an on-going routine is interrupted it is stored in a stack in the PC-register 24 for recall and completion after interruption.

TABLE IV

UPSIDE DOWN INTERRUPT ROUTINE (1) REACTION X:
    Hey    I'm upside down.
    [Oh-Oh]    [You're / upside down].
    [(sig. phrase)]    [I don't like / standing on my head].

(2) REQUEST X (Position Sensor):
    Please    Turn me over
    [Aw C'mon!]

(3) POSITIVE RESPONSE X (Not down):
    Whew    That's / much better!
    [(sigh)]    [Thanks so much / I feel a lot better]

(4) NEGATIVE RESPONSE X (Down):
    [Aw c'mon]    Being upside down / makes me dizzy.
    [Hey]    [Please! / Turn me over!]
    [(sig. phrase)]    [Y'know what? / I'm still / standing on my head].

(5) REACTION Y (Position Sensor):
[Hey] [That's / great!] I just love Standing on my head.
[(giggle)] [Do that again!] [I really like]

(6) NEGATIVE RESPONSE Y (Down):
    [Hey    That's enough!
    [Aw C'mon!]    [I'm still / standing on my head].
    [Ok]    [I don't like / standing on my head].

TABLE IV-continued
UPSIDE DOWN INTERRUPT ROUTINE

[(sig. phrase)]
[Excuse me]
... please / turn me over. / Ok?
(7) THIRSTY COMMENT:
    Wow!     [All this] / standing on my head / makes me awfully thirsty.
    [whew]
    [Y'know what?]
    [Hey]
    [(sig. phrase)]

In this routine the position of the doll being head down is sensed by sensor 36, and an interrupt signal is received at data port 35. The on-going routine will be interrupted and pushed down in the PC-register stack, then the routine of Table IV will be executed.

The foregoing described the logic and operation within each individual doll and how each doll may be a speaker or a responder (B or C). A single doll may be a responder in relation to a narrative from a recording medium.

Referring now to FIG. 6, it depicts a magnetic tape player exemplified by broken line 40, which includs a stereo player with a stereo tape cassette therein (not shown). Recorded on channel of the tape cassette designated by the numeral 41, is a story or narrative, for example, "Goldilocks And The Three Bears". Recorded on channel II designated by the numeral 42 are binary signals to be transmitted. The narrative will be converted to analog output by a conventional audio section 43 and applied to a speaker 44. The speaker 44 will broadcast the audio signals which will relate the recorded narrative with suitable pauses, for purposes hereinafter described.

On channel 42 are binary signals which will tell a doll that:
1. It is a "C" doll;
2. Identify a concatenation list entry;
3. A response which is:
    a. speak first speech entry in a specified routine;
    b. pick a random entry from a session;
    c. randomly choose from concatenation list.

The binary signals on channel 42 may be a two byte signal of eight bits each, which will tell a doll it will be a "C" doll, and not a speaker ("A" doll) or a primary responder ("B" doll). This binary signal will be repeated at intervals which will keep the doll from going into a HRE event, as previously described, or initiating a single doll sequence, as set forth in Table IV. In other words, the doll's responses are made subservient to the narration.

The binary signals from channel 42 are applied to an encoder 45, which may be a frequency shift encoder generating one frequency for binary "1" and another frequency for binary "0". Such signals are RF transmitted by transmitter 46 and an antenna 47 to a receiving doll.

The transceiver 15 of a doll will receive such signal and forward it via data port 34 to RAM 26 for interpretation.

The vocabulary and concatenation list set forth in Table III is only partial and set forth for one routine of two or more interacting dolls, for purposes of exemplifying the routine of Table II.

The vocabulary and concatenation list may also include the following, which is set forth for particular narraitve or story:

TABLE V
| ADDRESS | PHRASE | |
|---|---|---|
| 300 | Porridge | |
| 301 | I prefer | |
| 302 | | Bean soup |

Assume the narrative is one of "Goldilocks And The Three Bears, and a bear says, "Someone has eaten my porridge", channel 42 may have encoded thereon a code which includes the following instructions:
    a. Do not become an "A" or "B" doll;
    b. Concantenate address 78 (I really like) address and address 300 (porridge);
or
    a. Do not become an "A" or "B" doll;
    b. Concatenate address 301 (I prefer) and address 302 (bean soup).

Channel 42 of the tape may be programmed to address various terms of vocabulary in ROM 12 or randomly select appropriate responses as desired.

The vocabulary of ROM 12 is limited only by economic considerations, i.e., the amount to be invested in the storage capacity.

FIG. 7 illustrates another embodiment of the invention, where the doll is under control of a video screen. A television set 50 receives an input from a video tape cassette on a video cassette recorder (VCR) 51 of from a broadcast on video cable or from antenna; only the VCR 51 is shown. Recorded on the tape or included in the broadcast are light signals indicative of binary bytes, which are to be transmitted to a doll. The light signals are detected by a photoelectric sensor 52 and applied to a binary encoder 53. The encoder 53 then supplies the binary bytes to a transmitter 54 which transmits a binary encoded RF signal through an antenna 55 to a doll. The transmission is the same as that described in conjunction with FIG. 6. It will be understood that the elements 52, 53, 54 and 55 of FIG. 7 may be contained in one module.

It may thus be seen that the objects of the invention set forth, as well as those made apparent from the foregoing description, are efficiently attained. Although preferred embodiments of the invention have been set forth for purposes of disclosure, modification of the disclosed embodiments of the invention, as well as other embodiments thereof, may occur to those skilled in the art. Accordingly, the intended claims are intended to cover all of the embodiments of the invention and modifications to the disclosed embodiments which do not depart from the spirit and scope of the invention.

Having thus described the invention, what is claimed is:

1. In combination, a talking toy and an external signal generating means, said talking toy including
    (a) a central processing unit;
    (b) a speech synthesizer including a digital to analog converter;
    (c) a memory for storing speech data in digital form;
    (d) a speaker coupled to said digital to analog converter to produce synthesized human speech, said central processing unit being arranged to access said memory to select speech data therefrom and supply said accessed data to said synthesizer, said speech data being stored in said memory in addresses which may be accessed to produce phrases of human speech; and (e) a radio frequency receiver coupled to said central processing unit to receive a binary encoded signal indicative of speech data to be elicited from said memory; said external signal generating means including
 (i) means for transmitting a radio frequency signal to said toy, said signal having binary encoded instructions for eliciting speech data from the memory of said toy; and
 (ii) means for narrating a story to which speech comments from the toy are elicited.

2. The combination of claim 1 wherein said external signal generating means is a two track cassette player with a tape having the narration on one track and binary signals on the other for eliciting speech data from said memory.

3. The combination of claim 1 wherein said external signal generating means includes a television receiver and video input thereinto which will manifest a recognizable code indicative of the binary coded instructions, means for recognizing said code, and means responsive to said recognition means for transmitting said radio frequency signal.

4. The combination of claim 3 wherein said recognizable code is light patterns displayed on said television receiver and said means for recognizing is a photo sensitive sensor.

5. The combination of claim 1 wherein said toy also includes a transmitter and the toy may initiate simulated speech and transmit binary encoded signals indicative thereof, and wherein said binary encoded signal from said external signal generating means inhibits speech initiation by said toy.

6. In combination, a talking toy and cassette tape player, said talking toy including
 (a) a central processing unit;
 (b) a speech synthesizer including a digital to analog converter;
 (c) a memory for storing speech data in digital form;
 (d) a speaker coupled to said digital to analog converter to produce synthesized human speech, said central procesing unit being arranged to access said memory to select speech data therefrom and supply said accessed data to said synthesizer, said speech data being stored in said memory in addresses which may be accessed to produce phrases of human speech; and
 (e) a radio frequency receiver coupled to said central processing unit to receive a binary encoded signal indicative of speech data to be elicited from said memory; said cassette tape player including
  (i) means for transmitting a radio frequency signal to said toy, said signal having binary encoded instructions for eliciting speech data from the memory of said toy; and
  (ii) means for narrating a story to which speech comments from the toy are elicited.

7. The combination of claim 6 wherein said cassette tape player is a two track cassette player with a tape having the narration on one track and binary signals on the other for eliciting speech data from said memory.

8. The combination of claim 7 wherein said toy also includes a transmitter and the toy may initiate simulated speech and transmit binary encoded signals indicative thereof, and wherein said binary encoded signal from said tape player inhibits speech initiation by said toy.

* * * * *